United States Patent [19]

Lee et al.

[11] 4,392,979
[45] Jul. 12, 1983

[54] MAGNESIUM ALUMINATE ANION EXCHANGERS

[75] Inventors: John M. Lee; William C. Bauman, both of Lake Jackson, Tex.

[73] Assignee: Dow Chemical Co., Midland, Mich.

[21] Appl. No.: 360,716

[22] Filed: Mar. 22, 1982

Related U.S. Application Data

[60] Division of Ser. No. 183,907, Sep. 4, 1980, Pat. No. 4,326,961, which is a continuation-in-part of Ser. No. 71,920, Aug. 31, 1980, Pat. No. 4,243,555, which is a division of Ser. No. 939,544, Sep. 5, 1978, Pat. No. 4,183,900, which is a division of Ser. No. 812,542, Jul. 5, 1977, Pat. No. 4,116,857.

[51] Int. Cl.³ .......................... B01J 41/02; C01F 7/02
[52] U.S. Cl. ..................................... 252/184; 210/683; 252/463; 423/600
[58] Field of Search ................ 252/184, 463; 210/683; 423/600

[56] References Cited

U.S. PATENT DOCUMENTS

| | | | |
|---|---|---|---|
| 2,203,173 | 7/1940 | Urbuin et al. | 210/683 |
| 3,300,277 | 1/1967 | Schenck | 423/600 |
| 4,116,857 | 9/1978 | Lee et al. | 252/184 |
| 4,145,400 | 3/1979 | Adsetts | 423/600 |
| 4,273,587 | 6/1981 | Oda et al. | 423/600 |

OTHER PUBLICATIONS

Brutton, Ceramic Bulletin, vol. 48, No. 11, (1969) pp. 1069-1075.

*Primary Examiner*—Irwin Gluck
*Attorney, Agent, or Firm*—W. J. Lee

[57] ABSTRACT

Preparations and uses are shown for novel crystalline aluminates which conform generally to the empirical formula $$MgA_a{}^vZ_b{}^v.nAl(OH)_3.mH_2O$$

where A and Z represent negative-valence ions or radicals selected from the group comprising hydroxyl, halide, inorganic acid, and organic acid,
n is a value of from about 1 to about 2,
v is a negative valence of 1, 2, or 3,
a and b each have values of from zero to 2,
with (va)+(vb) equal to 2, and
with m being a value of zero or more.

27 Claims, No Drawings

MAGNESIUM ALUMINATE ANION EXCHANGERS

CROSS-REFERENCE TO RELATED APPLICATION

This is a divisional of application Ser. No. 183,907, filed 9-4-80, now U.S. Pat. No. 4,326,961 which is a continuation-in-part Ser. No. 71,920 filed Aug. 31, 1980, Pat. No. 4,243,555 is a divisional of Ser. No. 939,544 filed Sept. 5, 1978, now U.S. Pat. No. 4,183,900, which is, itself, a divisional of Ser. No. 812,542 filed July 5, 1977, now U.S. Pat. No. 4,116,857.

BACKGROUND OF THE INVENTION

In our U.S. Pat. Nos. 4,116,857 and 4,183,900 it is shown that microcrystalline $MgX_2.2Al(OH)_3$, where X is halide, prepared as a dispersion in situ within a particulate macroporous anion exchange resin is useful in selectively removing $Mg^{++}$ values from brines. It is understood, of course, that the crystals may contain waters of hydration. Additional embodiments, preparations, and uses of the crystalline $MgX_2.2Al(OH)_3$ are the principal subjects of this application.

Aside from the many naturally-occurring aluminates, there are synthesized metal aluminates such as found, e.g., in U.S. Pat. Nos. 2,395,931, 2,413,184, 3,300,577 and 3,567,472.

SUMMARY OF THE INVENTION

Crystalline $MgX_2.2Al(OH)_3$ is prepared by reacting $MgX_2$ (where X=halide, especially chloride) with $Al(OH)_3$ at elevated temperature. The so-formed crystalline $MgX_2.2Al(OH)_3$ is contacted with alkali metal hydroxide (esp. NaOH) to form novel crystalline $Mg(OH)_2.nAl(OH)_3.mH_2O$. The $Mg(OH)_2.nAl(OH)_3$ is reacted with negative radicals or anions to form novel crystalline $MgAZ.nAl(OH)_3.mH_2O$ compounds, where A and Z represent negative radicals or anions selected from the group comprising of hydroxyl, halide, inorganic acids, and organic acid as disclosed in greater detail below.

DETAILED DESCRIPTION OF THE INVENTION

A carrier or medium is provided with alumina hydrate, $Al(OH)_3$, dispersed therein. The $Al(OH)_3$ is then reacted with brine containing $MgX_2$ at elevated temperature to form crystalline $MgX_2.2Al(OH)_3$, where X is a halide, preferably chlorine. When the micro-crystalline $MgX_2.2Al(OH)_3$ is formed and dispersed in situ in a particulate, reticular anion exchange resin, the composite is particularly useful in selectively removing $Mg++$ values from brines (as per U.S. Pat. Nos. 4,116,857 and 4,183,900).

The crystalline $MgX_2.2Al(OH)_3$ when prepared as a free precipitate, when supported on a substantially inert substrate, or when supported by (or dispersed in) a cation exchange resin, is useful as an exchanger of negative radicals or anions, such as hydroxyl ions, halide anions, inorganic acid anions, or organic acid anions, thereby forming novel compounds of the general formula $MgAZ.nAl(OH)_3.mH_2O$ where A and Z are monovalent anions of the group consisting of hydroxyl ions, halide ions, inorganic acid anions, and organic acid anions.

Throughout this disclosure X is employed to denote halide ions in the crystalline $MgX_2.2Al(OH)_3$ which serves as the precursor to the crystalline $Mg(OH)_2.nAl(OH)_3$. The symbols A and Z are employed to denote anions which then replace part or all of the hydroxyl groups attached to Mg in the crystalline $Mg(OH)_2.nAl(OH)_3$. Any of these products may contain waters of hydration.

The present invention provides new and useful crystalline magnesium aluminates conforming generally to the empirical formula $$MgA_a{}^vZ_b{}^v.nAl(OH)_3.mH_2O$$

where
  A and Z represent negative-valence ions or radicals selected from the group comprising hydroxyl, halide, inorganic acid, and organic acid,
  n is a value of from about 1 to about 2,
  v is a negative valence of 1, 2, or 3,
  a and b are each values of from zero to 2,
  with (va)+(vb) equal to 2, and
  with m being a value of zero or more.

Throughout this disclosure, the waters of hydration are not always shown in the empirical formulas, but unless the compounds have been dehydrated, some waters of hydration are most likely present.

Of special interest is the reaction of the crystalline $MgX_2.2Al(OH)_3$, where X is halide (especially chlorine), with NaOH in sufficient quantity at elevated temperature to form novel crystalline $Mg(OH)_2.nAl(OH)_3.mH_2O$ which is found to undergo exchange with anions to form novel crystalline $MgAZ.nAl(OH)_3.mH_2O$ compounds.

The so-formed crystalline $MgAZ.nAl(OH)_3$ compounds are useful as sources of the radicals or anions (A and/or Z) by chemically or thermally releasing such anions in a desired media. Also, the novel $Mg(OH)_2.nAl(OH)_3$ and $MgAZ.nAl(OH)_3$ compounds are useful in forming $MgAl_2O_4$ spinel structures at very high temperatures.

As disclosed in our U.S. Pat. Nos. 4,116,857 and 4,183,900, referred to supra and incorporated herein by reference, the crystalline $MgX_2.2Al(OH)_3$ (X=halide) may be prepared within the reticules of a particulate anion exchange resin, e.g., by the following steps:

1. combine the resin with aqueous $AlCl_3$ to obtain penetration of the $AlCl_3$ into the reticules of the resin;
2. convert the $AlCl_3$ to $Al(OH)_3$ by reaction with, e.g., $NH_4OH$, washing out extraneous material; and
3. add $MgX_2$ (e.g. $MgCl_2$) and heat at elevated temperature for a time sufficient to form crystalline $MgX_2.2Al(OH)_3$.

In the context of this present disclosure, the crystalline $MgX_2.2Al(OH)_3$ may also be obtained by alkaline precipitation of $AlCl_3$ in an aqueous carrier or medium. The aqueous medium may also contain other liquid or dissolved materials which may be tolerated so long as they do not prevent the precipitation of the $Al(OH)_3$ or do not contaminate the $Al(OH)_3$ to such an extent that subsequent formation of reasonably pure $MgX_2.2Al(OH)_3$ is substantially deterred.

The aqueous media may also contain non-dissolved substances, such as ion exchange resins (cationic or anionic), inorganic particles, or organic polymers which may be reticular or substantially non-reticular, and which may be found to be beneficial so long as they are substantially inert with respect to the reactions involved in the formation of $Al(OH)_3$ or of the subsequent formation of crystalline $MgX_2.2Al(OH)_3$. These non-dissolved substances beneficially serve as substrates onto which (and into which) the $MgX_2.2Al(OH)_3$ crystals may form. These non-dissolved substances, which shall be referred to herein as "substrates", may be porous or non-porous ion exchange resins (anionic or cationic), may be organic (including polymers), or may be inorganic such as stable metal oxides. The amount of crystalline $MgX_2.2Al(OH)_3$ which may be deposited on a given weight of substrate is largely dependent on the surface area of the substrate, therefore it is generally best if the substrate is in finely divided form. It is evident, of course, that the substrate selected should be one which will withstand the heating steps involved in the formation of the $MgX_2.2Al(OH)_3$ and withstand any subsequent desired reactions without interfering to any substantial extent with the desired reactions. The substrate, then, should be one which is substantially inert and substantially stable in the operation of the present invention. In those instances where the $MgX_2.2Al(OH)_3$ is converted to $MgAZ.nAl(OH)_3$ and/or $Mg(OH)_2.nAl(OH)_3$ which, in turn, is to be converted at high temperature to spinels, then selection of substrate, if any, requires consideration of the effect of high temperature on such substrate.

The following examples are to illustrate the practice of the present invention, but the invention is not limited to the particular embodiments illustrated.

EXAMPLE 1

An amorphous form of $Al(OH)_3$, 0.15 mol quantity, is precipitated by adding $NH_4OH$ to an aqueous solution of $AlCl_3$. To the so-formed $Al(OH)_3$ slurry is added 0.6 mole of $MgCl_2$. The mixture is heated to 70° C., adding $NH_4OH$ as needed to hold the pH up to 6.7 or more, then filtered and washed with $NH_4OH$, then $H_2O$. The so-formed $MgCl_2.2Al(OH)_3$ is redispersed with 5% aqueous solution of $MgCl_2$ (to assure more complete conversion of the $Al(OH)_3$) and heated at 95° C. overnight. Then filter, wash ppt. on filter with equimolar mixture of $NH_4Cl/NH_4OH$, then with $NH_4OH$. Crystallinity of $MgCl_2.2Al(OH)_3$ is confirmed by x-ray diffraction pattern.

To the above product is added NaOH (1N solution) to pH 11, and heated to 80° C. with stirring to disperse the solids. This is filtered, the solids combined with more NaOH (1N solution) to pH 11, heated to 80° C., and refiltered. The NaOH reaction step is repeated 3 times as a precaution to assure substantially complete conversion to $Mg(OH)_2.2Al(OH)_3$. Then the filtered material is redispersed in $H_2O$, heated, and filtered, then re-diluted with $H_2O$ and heated at 95° C. overnight to assure substantially complete crystallization. Upon passing the slurry through a mixed bed of Dowex 50-H+ and Dowex 1-OH− ion exchange resins ("Dowex" is a Tradename of The Dow Chemical Company) on a coarse glass fritted filter, the slurry particles are found to be fine enough to pass through. The pH at this point is about 10.4. The slurry is evaporated to 400 ml. volume and by titration of 10 ml. with N/1 HCl is found to contain 1.22 mmol Al per 10 ml. of slurry.

Portions of the so-formed stable dispersion of crystalline $Mg(OH)_2.2Al(OH)_2$ (confirmed by x-ray diffraction pattern) are found to be neutralized by the following acid ions: $Cl^-$, $ClO_4^-$, $H_2PO_4^-$, $HCrO_4^-$, $SO_4^{--}$, $NO_3^-$, $HPO_4^{--}$, and the anion of l-ascorbic acid, acetic acid, citric acid, and oxalic acid.

The above monovalent acid anions are represented by Z in the empirical formula $Mg(OH)Z.nAl(OH)_3$, the divalent anions are represented by Z in the empirical formula $MgZ.nAl(OH)_3$ and the trivalent anions are represented by Z in the empirical formula $MgZ_{2/3}.nAl(OH)_3$. When all the OH ions are replaced by monovalent anions the empirical formula is $MgZ_2.nAl(OH)_3$. In $MgAZ.nAl(OH)_3$, A and Z may be the same monovalent ions or different monovalent ions.

EXAMPLE 2

$AlCl_3$ (0.28 moles) in 900 ml. $H_2O$ is precipitated as $Al(OH)_3$ by addition of $NH_4OH$. $MgCl_2$ (1.0 mole) in water is added, with enough NaOH added to bring pH to 6.7 (neutral or barely basic). Heating the resulting ppt. at 70° C. causes crystallization. The $MgCl_2.2Al(OH)_3$ crystals are filtered out, washed with dil. $NH_4OH$, then with $H_2O$. Enough $MgCl_2$ (5% in $H_2O$) is added to moisten the ppt. to give excess $MgCl_2$. Overnight heating at 95° C. and NaOH neutralization assures substantially complete crystallization (confirmed by x-ray) of $Mg(OH)_2.2Al(OH)_3$. Demineralize with Dowex-50 cation exchange resin to take out excess $Cl^-$. At this point the fine particles of $Mg(OH)_2.2Al(OH)_3$ are easily dispersed in water to form a dispersion.

The $Mg(OH)_2.2Al(OH)_3$ is converted to $Mg(OH)(HCO_3).2Al(OH)_3$ by reaction with $CO_2$. The x-ray pattern is essentially the same.

EXAMPLE 3

Mix 625 gms. of aqueous slurry containing 2.15 mol. amorphous $Al(OH)_3$ with 172 gms. of aqueous slurry containing 1.075 mol of $Mg(OH)_2$ (brucite) and add 74 mmol of NaOH (as 50% aqueous solution). Warming to 70° C. causes thickening; add 200 ml. of $H_2O$ to thin and heat to 95° C. in oven for 16 hours. Resulting thick paste is stirred into water. A sample of the slurry is filtered, washed, and analyzed by x-ray and it is found that $Mg(OH)_2.2Al(OH)_3$ is the major crystalline component with a trace of bayerite (or gibbsite) and some amorphous $Al(OH)_3$ and $Mg(OH)_2$. The remaining slurry is put back into 95° C. for 24 hours and x-ray shows more crystalline $Mg(OH)_2.2Al(OH)_3$ with a small amount of boehmite.

A small disc (about 22 mm diameter and 7.5 mm thick) when pressed and fired at high temperature (>1200° C.) is found to have formed spinel, $MgAl_2O_4$, and to have a density of about 94% of theoretical.

There are, of course, many organic acids and inorganic acids which contain anions which are operable in the present invention. The larger the anion, the greater is the possibility of expanding the crystal lattice structure to the limit, while still maintaining the crystallinity. For example, with l-ascorbic acid (vitamin C) which is a 6-carbon molecule, the $Mg(OH)Z.2Al(OH)_3$ crystal is considerably expanded by the large anion (Z) which has replaced (exchanged with) one of the $OH^-$ ions. Other organic acids having from 1 to about 8 carbon atoms are within the purview of this invention, including monobasic, dibasic, and tribasic carboxylic acids.

The various novel compounds of the present invention may be used in forming spinels, $MgAl_2O_4$, at high temperature and are also useful in exchanging with other anions in various solutions. For instance, ascorbic acid groups may be released from the present crystalline compounds into solutions which contain other anions, such as $Cl^-$, which can replace the ascorbic acid in the crystal.

We claim:
1. Crystalline magnesium aluminates conforming generally to the empirical formula

$$MgA_a^v Z_b^v \cdot nAl(OH)_3 \cdot mH_2O$$

where
- A and Z represent negative-valence ions or radicals selected from the group comprising hydroxyl, halide, inorganic acid, and organic acid,
- n is a value of from about 1 to about 2,
- v is a negative valence of 1, 2, or 3,
- a is a value of from zero to 2,
- b is a value of from zero to 2,
- with (va)+(vb) equal to 2, and with m being a value of zero or more.

2. The compound of claim 1 wherein A is hydroxyl and Z is selected from the group comprising halide, inorganic acid, and organic acid ions or radicals.

3. The compound of claim 1 wherein both A and Z represent hydroxyl groups.

4. The compound of claim 1 wherein A represents hydroxyl groups and Z represents halide groups.

5. The compound of claim 1 wherein A represents hydroxyl groups and Z represents inorganic acid groups.

6. The compound of claim 1 wherein A represents hydroxyl groups and Z represents organic acid groups.

7. The compound of claim 1 wherein A and Z each represent different ions or radicals selected from the group comprising hydroxyl, halide, inorganic acid, and organic acid.

8. The compound of claim 1 wherein the AZ moiety represents the presence of divalent anions or divalent negative-valence radicals.

9. The compound of claim 1 wherein the AZ moiety represents the presence of trivalent anions or trivalent negative-valence radicals.

10. The compound of claim 1 wherein the AZ moiety represents the presence of the negative-valence organic acid group of l-ascorbic acid.

11. The compound of claim 1 wherein the halide is chlorine, bromine, or iodine.

12. The compound of claim 1 wherein the inorganic acid group is at least one selected from the group consisting of $ClO_4^-$, $SO_4^{--}$, $NO_3^-$, $HPO_4^{--}$, $H_2PO_4^-$, $HCrO_4^-$, and $HCO_3^-$.

13. The compound of claim 1 wherein the organic acid moeity is at least one selected from the group comprising carboxyl-containing radicals of mono, di, and tri-basic organic acids having up to about 8 carbon atoms in the radical and having a negative-valence of 1, 2, or 3 corresponding to the number of carboxyl groups present in the organic acid moiety.

14. A method for preparing the compounds of claim 1 which method comprises, contacting crystalline $Mg(OH)_2 \cdot nAl(OH)_3 \cdot mH_2O$, where n is a value of from about 1 to about 2 and m is a value of zero or more, with an aqueous medium containing negative-valent ions or radicals of the group comprising halide, inorganic acid, and organic acid, thereby replacing at least part of the OH groups with the said negative-valent ions or radicals.

15. A method for preparing crystalline $Mg(OH)_2 \cdot nAl(OH)_3 \cdot mH_2O$, where n is a value of from about 1 to about 2 and m is a value of zero or more, said method comprising reacting crystalline $MgX_2 \cdot 2Al(OH)_3$, where X is halide, with NaOH in aqueous medium, thereby replacing at least part of the halide groups with hydroxyl groups.

16. A composition of matter comprising crystalline $Mg(OH)_2 \cdot nAl(OH)_3 \cdot mH_2O$, where n is a value of about 1 to about 2 and where m is a value of zero or more.

17. The composition of claim 1 or 16 when supported by a substrate.

18. The composition of claim 1 or 16 when supported by a porous or reticular substrate.

19. The composition of claim 1 or 16 when supported by an inorganic substrate.

20. The composition of claim 1 or 16 when supported by an organic or polymeric substrate.

21. The composition of claim 1 or 16 when supported by an ion exchange resin.

22. The composition of claim 1 or 16 when dispersed in a liquid medium.

23. The composition of claim 1 or 16 when dispersed in an aqueous medium.

24. The composition of claim 1 or 16 when supported on a substrate and the substrate is, itself, in a liquid medium.

25. The composition of claim 24 where the liquid is an aqueous medium.

26. A process for preparing crystalline $Mg(OH)_2 \cdot nAl(OH)_3 \cdot mH_2O$ where n is a value of from about 1 to about 2 and m is a value of zero or more, said processing comprising
reacting amorphous $Al(OH)_3$ with $Mg(OH)_2$ at elevated temperature in an alkaline aqueous medium.

27. The process of claim 26 wherein the alkaline aqueous medium contains a substrate material onto which, and/or within which, the $Mg(OH)_2 \cdot nAl(OH)_3 \cdot mH_2O$ is formed.

* * * * *